United States Patent [19]

Tabatabaei

[11] Patent Number: 5,757,506
[45] Date of Patent: May 26, 1998

[54] VIDEO POSITIONING SYSTEM FOR A POURING VESSEL

[75] Inventor: Emad Tabatabaei, Eastampton, N.J.

[73] Assignee: Inductotherm Corp., Rancocas, N.J.

[21] Appl. No.: 868,550

[22] Filed: Jun. 4, 1997

Related U.S. Application Data

[63] Continuation of Ser. No. 479,313, Jun. 7, 1995, abandoned.

[51] Int. Cl.[6] .................................................. G01B 11/00
[52] U.S. Cl. .................................... 356/400; 164/4.1
[58] Field of Search .................................. 356/399–401, 356/394, 372, 373, 375; 164/457, 155, 156, 4, 4.1; 250/201

[56] References Cited

U.S. PATENT DOCUMENTS

| | | | |
|---|---|---|---|
| 3,821,545 | 6/1974 | Nakagawa | 250/201 |
| 4,112,998 | 9/1978 | Sato | 164/136 |
| 4,134,444 | 1/1979 | Fujie | 164/155 |
| 4,210,192 | 7/1980 | Lavanchy | 164/4 |
| 4,227,565 | 10/1980 | Lavanchy et al. | 164/155 |
| 4,245,758 | 1/1981 | McCabe | 222/52 |
| 4,672,676 | 6/1987 | Linger | 382/8 |
| 4,724,886 | 2/1988 | Sjodahl | 164/4.1 |
| 4,724,894 | 2/1988 | Sjodahl | 164/457 |
| 4,744,407 | 5/1988 | Fishman et al. | 164/457 |
| 5,315,630 | 5/1994 | Sturm | 378/65 |
| 5,381,855 | 1/1995 | Mezger | 164/457 |

FOREIGN PATENT DOCUMENTS

| | | |
|---|---|---|
| 0 659 504 | 6/1995 | European Pat. Off. . |
| 29 18 989 | 4/1980 | Germany . |
| 42 02 020 | 7/1993 | Germany . |
| 61-49218 | 3/1986 | Japan . |
| 4-190964 | 7/1992 | Japan . |
| 4-319067 | 11/1992 | Japan . |

Primary Examiner—Frank G. Font
Assistant Examiner—Michael P. Stafira
Attorney, Agent, or Firm—Seidel Gonda Lavorgna & Monaco, PC

[57] ABSTRACT

A video positioning system for positioning a pouring vessel over a mold sprue cup comprising one or more light fixtures for illuminating a notch on a pouring mold, an image sensor for sensing the position of the notch on the mold by producing a video notch image, a vision interface unit connected to the image sensor for converting the video notch image to digital information, and a processor connected to said vision interface unit for determining the relative position of the notch image compared to a reference position for the notch. Position correction information is sent to a position controller connected to the processor. The position controller causes the position of the pouring vessel to be adjusted by a positioning subsystem comprising a positioning driver for converting the positioning control signals to actuating signals for a positioning actuator, a positioning actuator, and at least one position sensor for sensing the position of the pouring vessel.

15 Claims, 3 Drawing Sheets

VIDEO POSITIONING SYSTEM FOR A POURING VESSEL

This is a continuation of application Ser. No. 08/479,313 filed on Jun. 7, 1995, now abandoned.

FIELD OF THE INVENTION

The present invention relates to the accurate positioning of molds in a molten metal pouring operation in foundry installations, and in particular to an apparatus and method which quickly and accurately positions the pouring vessel over the mold to be filled.

BACKGROUND OF THE INVENTION

In a foundry part casting operation it is extremely important to fill the casting molds quickly and accurately. The relative location of the pouring nozzle in relation to the mold sprue cup is an important factor in achieving this objective. In sand molding operation, the dimensions of a given volume of sand will vary due to differences in molding sand compactability. This means that each mold may have slightly different dimensions, even though the molds may be produced by automated machinery. The dimensional variations lead to changes in the relative location of the mold sprue cup and the pouring nozzle. The resulting misalignment causes splashing of molten metal, sand erosion, and can lengthen the time of pour. Splashing can damage equipment, sand erosion can contaminate the casting, and longer pour times can cause defects in the casting.

An earlier method for setting the correct mold position utilized a device (e.g., a roller, a probe) in contact with the side of the mold to physically sense a mark on the mold. Another method used an optical sensor to detect a point of light projected on the mold. Both these devices were placed close to the mold and were often damaged by excessive spillage and splashing of molten metal. They also had a very limited range of operation. The roller had to touch the side of the mold to detect the notch, and the optical sensor operated by detecting a change in distance between a light source and a spot on the surface of the mold. In the event that the reference mark was not present within the effective range of the devices, the positioning system had to hunt for it. This increased the overall time of operation (cycle time) and decreased the production yield.

SUMMARY OF THE INVENTION

The present invention is an apparatus and method for positioning a pouring vessel over a mold sprue cup accurately and quickly. The invention utilizes a non-contact method of sensing an indicium on or in the mold surface by using an image sensor, such as a video camera. The image sensor is connected to a processor that analyzes a video image from the image sensor and detects the presence and location of the indicium relative to a predetermined reference point. The processor determines a difference value between the detected indicium image and the reference location and sends positioning information to a positioning controller. The positioning controller activates a positioning subsystem that moves the pouring vessel so that the nozzle of the vessel is positioned in the proper relation to the sprue cup in the mold.

The image sensing device is located at a safe distance from the pouring operation. Because the image sensor has a large effective range, there is no necessity to hunt for the indicium. It is located within the field of view of the image sensor.

Occasionally a defective mold will emerge from the mold forming equipment. The indicium on a defective mold may be malformed and will not conform to the size, shape and location of the predetermined reference point. The present invention automatically detects bad molds (molds that should not be filled with molten metal) and inhibits the positioning system, preventing a pour into the bad mold.

Because the dimensions of sand molds can vary from one mold to the next, it may be necessary for the positioning system to correct the position of the pouring vessel for a succession of molds. In the case where each correction is in the same direction, the pouring vessel may reach the travel limit of the positioning subsystem. The invention automatically senses the position limit and readjusts the location of the pouring vessel when the maximum allowable travel limit has been reached.

DESCRIPTION OF THE INVENTION

The present invention is an apparatus and method for positioning a pouring vessel over a sand mold sprue cup by detecting the position of a video image of an indicium on the sand mold. Hereafter, this indicium will be referred to as a notch (though it may take other forms, such as a cross, an "X", or other visual indicator). The notch may be on the side or top of the mold or it could be the parting line between the halves of the sand mold. In the preferred embodiment of the invention described herein, the notch is formed in the side of the mold.

Figure 1:
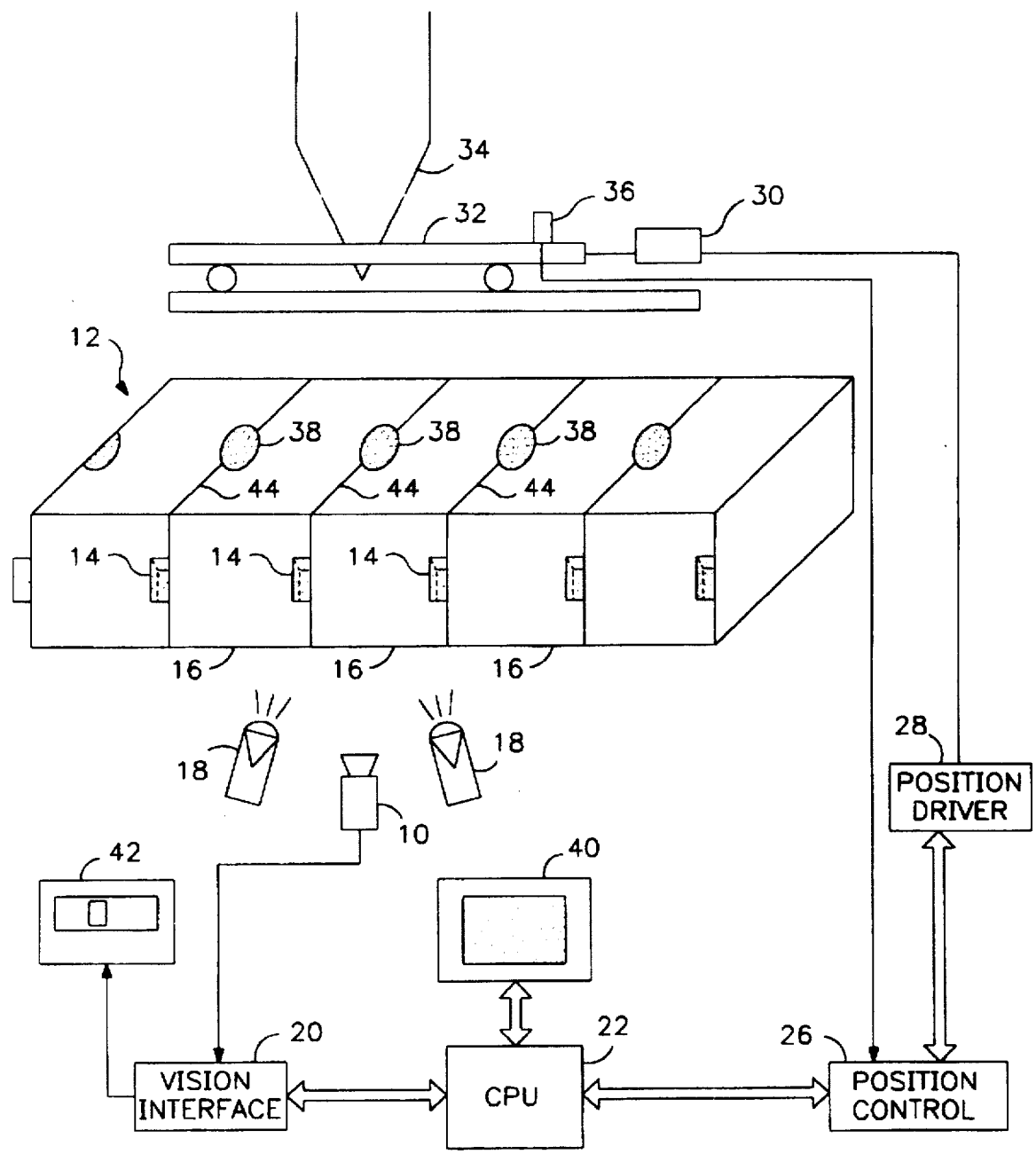
FIG. 1 is a functional block diagram of the positioning system of the present invention.

The various components and subsystems of the invention are illustrated in FIG. 1. An image sensor 10 is aimed at the side of a line of molds 12. The image sensor 10 may be a video camera or a digital image detector. A notch 14 is impressed on each mold 16 by an automatic mold forming machine (not shown). Light from at least one light source 18 is aimed at the notch 14 at a sufficient angle to cause a shadow to be cast in the interior of the notch 14. The video effect of the shadow is a dark shape representative of the shape of the notch 14 in a brighter field.

Where, as in FIG. 1, the image sensor is a video camera with an analog output, the image must be converted to digital form in a video interface unit 20. The video interface unit 20 converts an analog video signal into a matrix of pixels, assigning each pixel a numerical value proportional to the intensity of light present in that part of the video image represented by the individual pixel. In this way, a video image may be represented by a two dimensional matrix of numbers corresponding to the number of pixels in a video frame. Each pixel value represents the relative brightness of the small part of the image encompassed by the pixel. In a digital image sensor, of course, the pixel matrix is created within the image sensor, presenting a digital output rather than an analog signal.

The digitized image is sent to a central processor 22 where it is analyzed by a location detection algorithm. The algorithm determines the size, shape and density of the image of the notch 14 that has been detected by the image sensor 10. The processor 22 compares the detected location of the notch image with a predetermined notch location stored in memory.

The processor 22 calculates a difference value between the position of the detected notch image and the predetermined notch location. The difference value is sent to a position controller 26. The function of the position controller 26 is twofold. It converts the difference value from the processor 22 into driving command signals to be sent to a positioning subsystem. The position controller 26 also monitors the position of the pouring vessel positioning device 32 through a position sensor 36 that sends position data from the positioning device 32 to the position controller 26. The positioning sensor 36 may be any device capable of tracking the movements of the positioning device 32, or its X-Y position, or both, and producing an output signal.

The positioning subsystem moves the pouring vessel 34 into the correct position over the mold sprue cup 38 for a proper pour to be effected. The positioning subsystem of the preferred embodiment of the invention comprises a positioning driver 28, a positioning actuator 30, and a positioning device 32. The positioning driver 28 converts signals from the position controller 26 into driving impetus (electrical or mechanical) for the positioning actuator 30. The positioning actuator 30 converts the driving impetus into physical force to move the positioning device 32 and, thus, the pouring vessel 34 into position over the mold sprue cup 38.

The positioning device of the preferred embodiment of the invention is an X-Y positioning table, though other apparatus may be employed to move the pouring vessel. The X-Y positioning table is moved by the positioning actuator 30, which may be an electric, pneumatic, or hydraulic actuator or other mechanical means of moving the positioning device 32. Thus, the character of the driving input provided by the positioning driver 28 may be electrical current, pressurized air or fluid, or any other suitable impetus.

As the positioning device 32 moves in response to the signals from the position controller 26, the location of the positioning device 32 is monitored by the position sensor 36. In the preferred embodiment of the invention, the X-Y position of the positioning table is sensed and transmitted to the position controller 26. The position controller 26 determines when the notch location correction calculated by the processor 22 has been implemented by the positioning subsystem and stops the movement of the pouring vessel 34.

The processor 22 in the system may be any readily available microprocessor for controlling industrial equipment, programmed with the algorithm for analyzing the notch image provided by the image sensor. Pattern recognition algorithms are well known in industrial control applications and are considered to be within the capability of one skilled in the art to select and implement.

The position controller may be another processor. The position controller has fewer functions to perform, and need not be as complex as the system processor. The position controller converts difference information from the system processor 22 into signals that are compatible with the positioning subsystem components, be they electrical, pneumatic, hydraulic or mechanical. The position controller 26 should be capable of receiving and processing the signals returned from the position sensor on the positioning device 32. Using the position information returned from the position sensor 36, the position controller 26 can determine when the corrective movement of the pouring vessel required by the processor has been accurately accomplished.

The location of the notch 14 on the mold 16 is sensed by the image sensor 10 each time a new mold is indexed into position. The sensed location is compared to a reference notch location by the processor. The reference notch location is established manually by an operator before automated operation begins. The video positioning system comprises a man-machine interface 40 and a video monitor 42 that are used by the operator to establish the reference notch location. The man-machine interface may comprise a keyboard, joystick, mouse, trackball or other input device. The mold line 12 is advanced until a mold sprue cup 38 is positioned under the nozzle of the pouring vessel 34 in the correct position to pour molten metal without spillage, damage or unnecessary delay. The operator commands the processor to store the video representation of the notch 14 on the reference mold in the processor's memory for comparison to the video notch images that will be obtained each time a new mold is indexed into position.

The position of the mold 16 when setting the reference notch position becomes the index position for each mold in the mold line 12. As each successive mold 16 is indexed into position during operation, the image of the notch 14 on the mold 16 is processed to detect variation from the reference notch location. Differences in notch position are corrected by the positioning subsystem.

The notch 14 on the mold may be any simple shape (complex shapes may be used, but would require more demanding analysis by the processor). Notch 14 should have a clearly defined edge and sufficient depth that, when illuminated by a light source 18 at an oblique angle, a shadow is cast within the notch 14 that distinctly defines the notch 14 and distinguishes it from the surrounding mold surface. More than one light source may be employed to clearly define the notch image for the image sensor 10. The notch 14 may be located on the side or the top of the mold 16, and may be on the parting line 44 between two mold segments. The parting line 44 itself may serve as the notch.

Since the image sensor 10 and its optics provide a large field of view, the notch 14 is necessarily within the image sensor's field and there is no need for the system to hunt for the notch. The large field of view also allows for accurate positioning of the pouring vessel even when there are large variations in the dimensions of successive sand molds. As noted previously, variations in mold dimensions can result from changes in sand compactibility or from introducing a different sand mold (i.e., a new casting pattern) into the mold line 12.

It is possible that successive corrections to the position of the pouring vessel 34 will cause the vessel to be moved by small increments in only one direction. After several such corrections, the pouring vessel 34 may reach the limit of its travel range in that direction. The positioning sensor 36 can detect the limit of the travel range of the vessel 34 and alert the positioning system to that condition. The processor takes corrective action to reposition the pouring vessel over an empty mold.

The present invention can also detect defective molds and alert the system to their presence. A defective mold often will be badly formed, resulting in a misshapen notch. The image processor 22 detects the malformed notch when it analyzes the size and shape of the notch image provided by the image sensor 10. A bad mold must not be filled with molten metal. The present invention sends a signal to the operator through the man-machine interface 40 to indicate the presence of the bad mold. The positioning system does not position the pouring vessel over the bad mold, and the pouring operation with respect to that mold is inhibited.

Figure 2A:
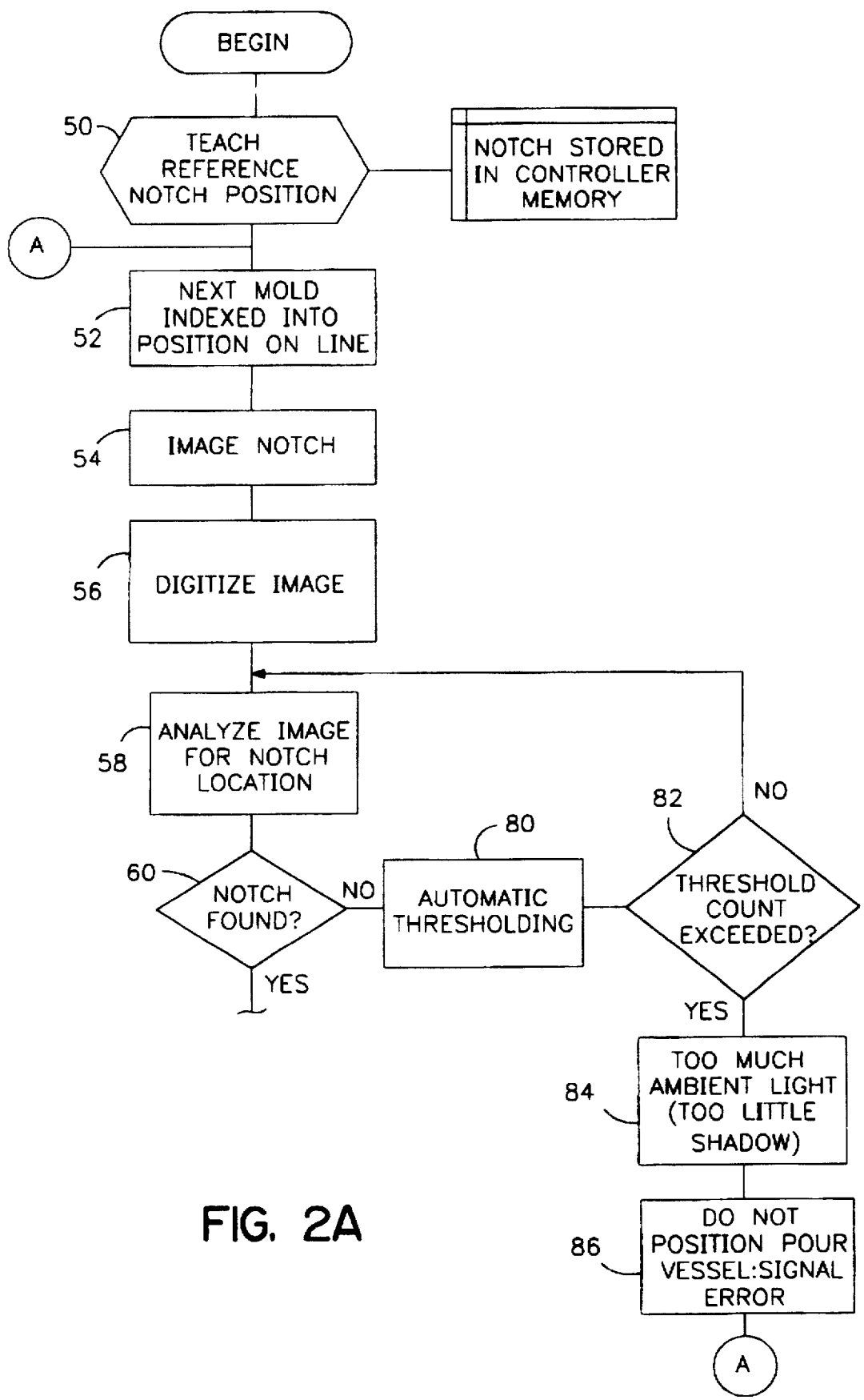
FIG. 2 is a process flow chart for the method of positioning the pouring vessel using the apparatus of the invention.
Figure 2B:
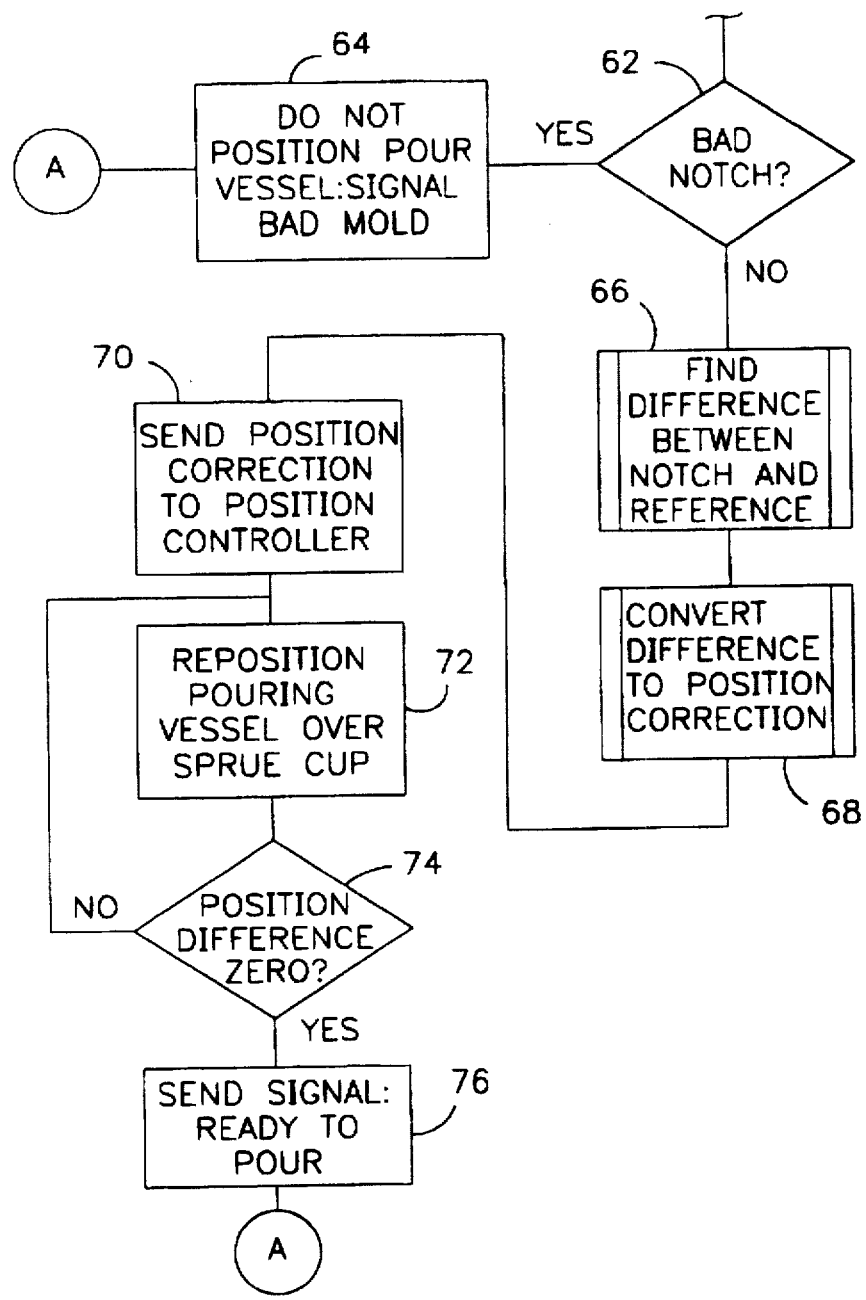

The method for positioning a pouring vessel by video detection and positioning is illustrated in FIG. 2. For the following discussion, the reference numerals appearing in parentheses correspond to the numerals in FIG. 2 denoting a step in the process. After the operator sets the reference notch position (50), the next mold in the mold line is indexed into position for pouring (52). The imaging sensor images the notch on the mold (54). The notch image is digitized (56). The notch image, represented now as a digital matrix of numerical values, is analyzed to determine the notch position (58).

Once the notch is imaged and analyzed (60), the image of the notch is checked to determine if the notch conforms to the size and shape that it should (62). If it does not, then the notch is bad and indicates a bad mold that should not be used (62). If the mold is bad, the pouring vessel is not positioned, pouring is inhibited and the processor signals the operator that the mold is bad (64). The next mold is then automatically moved into position by the mold machine.

If the notch image is acceptable, the location difference between the notch image and the reference notch position is determined (66). That difference is converted to a position correction value (68). The position correction value is sent to a position controller (70). The pouring vessel is moved relative to the mold sprue cup by an amount sufficient to compensate for the position difference between the notch image and the reference notch position (72). The repositioning continues until the location difference between the notch image and the reference image is zero (74). The operator is signalled when the correct position has been reached (76).

On occasion, the ambient light in the pouring area may make it difficult for the imaging system to detect the notch on the mold. The method allows for adjustment of the lighting threshold in the detection algorithm and re-analysis of the digitized notch image (80, 82, 58, 60) until a limit is reached. If the notch cannot be detected after threshold adjustment, too much ambient light is washing out the notch image on the mold and the system must stop and signal an error to the operator (84, 86).

The present invention may be embodied in other specific forms without departing from the spirit or essential attributes thereof. Accordingly, reference should be made to the appended claims, rather than to the foregoing specification, as indicating the scope of the invention.

I claim:

1. A video positioning system for positioning a pouring vessel over a mold sprue cup by locating a reference indicium on a pouring mold, comprising:

a recessed indicium on a casting mold;

at least one light source arranged to illuminate said indicium at an oblique angle thereto to cause a shadow to be made within the indicium, said shadow having a size and shape determined by the shape and dimensions of the indicium, and having a shape, density and contrast that visually distinguishes the indicium from its surrounding visual field;

an image sensor for sensing the position of the indicium on the mold by producing a video image of the indicium;

a vision interface unit connected to the image sensor for converting the video indicium image to digital information;

a processor connected to said vision interface unit for determining the relative position of the indicium image compared to a reference position for the indicium, said processor producing a difference signal representing the relative position difference of said indicium from said reference position, said indicium shadow size and shape presenting an object for video image analysis by the processor to automatically detect a malformed indicium.

2. A video positioning system for positioning a pouring vessel over a mold sprue cup by locating a reference indicium on a pouring mold, comprising:

a recessed indicium on a casting mold;

at least one light source arranged to illuminate said indicium at an oblique angle thereto to cause a shadow to be made within the indicium, said shadow having a size and shape determined by the shape and dimensions of the indicium, and having a shape, density and contrast that visually distinguishes the indicium from its surrounding visual field;

an image sensor for sensing the position of the indicium on the mold by producing a video image of the indicium;

a vision interface unit connected to the image sensor for converting the video indicium image to digital information;

a processor connected to said vision interface unit for determining the relative position of the indicium image compared to a reference position for the indicium, said processor producing a difference signal representing the relative position difference of said indicium from said reference position, wherein said image sensor, video interface and processor detect the shadow density and contrast versus the surrounding visual field and perform a threshold analysis, such that the processor produces an error signal when insufficient contrast for accurate positioning is detected.

3. The video positioning system of claim 2, wherein said indicium shadow size and shape presents an object for video image analysis by the processor to automatically detect a malformed indicium.

4. The video positioning system of claim 2, wherein said image sensor has a field of view much larger than the dimension of the indicium being imaged, such that said indicium may be detected by the image sensor without hunting for the indicium.

5. A video positioning system for positioning a pouring vessel over a mold sprue cup by locating a reference indicium on a casting mold, comprising:

a recessed indicium on a casting mold;

at least one light source arranged to illuminate said indicium at an oblique angle thereto to cause a shadow to be made within the indicium, said shadow having a size and shape determined by the shape and dimensions of the indicium, and having a shape, density and contrast that visually distinguishes the indicium from its surrounding visual field;

an image sensor for sensing the position of the indicium on the mold by producing a video image of the indicium;

a vision interface unit connected to the image sensor for converting the video indicium image to digital information;

a processor connected to said vision interface unit for determining the relative position of the indicium image compared to a reference position for the indicium, said processor producing a difference signal representing the relative position difference of said indicium from said reference position, a position controller connected to the processor for receiving said difference signal from the processor and producing positioning control signals.

a positioning driver for receiving said positioning control signals and converting said control signals to actuating signals for a positioning actuator, a positioning actuator receiving actuating signals from the positioning driver, said actuator acting on and adjusting the position of the pouring vessel relative to the mold sprue cup, and at least one position sensor for sensing the position of the pouring vessel, said position sensor providing a signal to the system processor representing that the pouring vessel is at its travel limit, causing the positioning system take corrective action.

6. The video positioning system of claim 5, wherein said image sensor has a field of view much larger than the dimension of the indicium being imaged, such that said indicium may be detected by the image sensor without hunting for the indicium.

7. The video positioning system of claim 5, wherein the shadow made within the indicium has a predetermined size and shape dependent upon the dimensions of the indicium, and wherein said indicium shadow size and shape presents an object for video image analysis by the processor to automatically detect a malformed indicium.

8. The video positioning system of claim 5, wherein said image sensor, video interface and processor detect the shadow density and contrast versus the surrounding visual field and perform a threshold analysis, such that the processor produces an error signal when insufficient contrast for accurate positioning is detected.

9. The video positioning system of claim 5, wherein said image sensor has a field of view much larger than the dimension of the indicium being imaged, such that said indicium may be detected by the image sensor without hunting for the indicium, and the shadow made within the indicium has a predetermined size and shape dependent upon the dimensions of the indicium, and wherein said indicium shadow size and shape presents an object for video image analysis by the processor to automatically detect a malformed indicium.

10. A process for positioning a pouring vessel over a pouring mold sprue cup using a video positioning system, comprising the steps:

providing a recessed indicium on a casting mold, illuminating said indicium on a casting mold with at least one light source disposed at an oblique angle to said indicium to cause a shadow to be made within the indicium, said shadow having a shape, density and contrast that visually distinguishes the indicium from its surrounding visual field, imaging the position of the indicium by producing a video image of the shadow in the indicium, converting the video image of the indicium shadow into digital data, processing the digital image of the size and shape of the indicium shadow for automatic detection of a malformed casting mold, processing the digital image of the density and contrast of the indicium shadow to confirm that the image density and contrast exceeds a threshold value, said threshold value being the minimum value that permits accurate positioning of the pouring vessel.

11. The process for positioning a pouring vessel over a pouring mold sprue cup of claim 10, further comprising the steps:

processing correct pouring vessel positioning information based on the location of the indicium image, energizing a positioning driver to move the pouring vessel into a correct position over the mold sprue cup to effect a successful casting pour.

12. The process for positioning a pouring vessel over a pouring mold sprue cup of claim 11, further comprising the steps:

sensing a limit signal from a travel limit sensor for detecting the limit of distance that the pouring vessel may be moved, and correcting the position of the casting molds to bring the pouring vessel within its range of adjustment.

13. A video positioning system for positioning a pouring vessel over a mold sprue cup by locating a reference indicium on a casting mold, comprising:

a recessed indicium on a casting mold;

at least one light source arranged to illuminate said indicium at an oblique angle thereto to cause a shadow to be made within the indicium, said shadow having a size and shape determined by the shape and dimensions of the indicium, and having a shape, density and contrast that visually distinguishes the indicium from its surrounding visual field;

a means for imaging the shadow in the indicium, a means for converting the shadow image to digital data;

a means for processing the digital data of the shadow image to determine the relative position of the indicium compared to a predetermined reference position for the indicium, said processing means producing a difference signal representing the relative position difference of said indicium from said reference position;

a means for positioning the pouring vessel relative to the mold sprue cup based on the position of the indicium determined by the processing means;

and a means for sensing a limit of travel of the pouring vessel such that the processing means and positioning means may take corrective action when said limit of travel is reached.

14. The video positioning system of claim 13, wherein said indicium shadow size and shape presents an object for video image analysis by the processor to automatically detect a malformed indicium.

15. The video positioning system of claim 13, wherein said processing means performs an analysis of the density and contrast of the shadow compared to the surrounding visual field, and compares said analysis to a minimum threshold value, said value being the minimum value that permits accurate positioning of the pouring vessel.

* * * * *